Aug. 24, 1965  C. C. GAMBILL ETAL  3,202,899
MOTOR CONTROL SYSTEM
Filed Dec. 21, 1961

INVENTORS
CHARLES C. GAMBILL
ALFRED B. ROBY
BY Edwin S. Dybvig
THEIR ATTORNEY

United States Patent Office 3,202,899
Patented Aug. 24, 1965

3,202,899
MOTOR CONTROL SYSTEM
Charles C. Gambill, Tipp City, and Alfred B. Roby, Dayton, Ohio, assignors to General Motors Corporation, Detroit, Mich., a corporation of Delaware
Filed Dec. 21, 1961, Ser. No. 161,204
2 Claims. (Cl. 318—341)

This invention relates to a control system and more particularly to a control circuit for varying the flow of current to an electric motor or the like.

It is an object of this invention to provide an improved control for a motor which provides for infinite variation of the current flow to the motor.

Another object of this invention is to provide a variable speed motor control circuit which eliminates the need for switch contacts.

More particularly, it is an object of this invention to provide a control system including a plural path rectifier network comprising first and second groups of unidirectional conducting devices connected between the power source and a power consuming device and a silicon controlled rectifier connected in series with the unidirectional conducting means which is under control of a four-layer diode circuit.

Further objects and advantages of the present invention will be apparent from the following description, reference being had to the accompanying drawing wherein a preferred embodiment of the present invention is clearly shown.

In the drawing:

FIGURE 1 is a schematic diagram showing a preferred embodiment of the invention for use in controlling an alternating current motor or the like;

FIGURE 3 is a schematic diagram showing a control for a direct current motor or the like.

Figure 1:
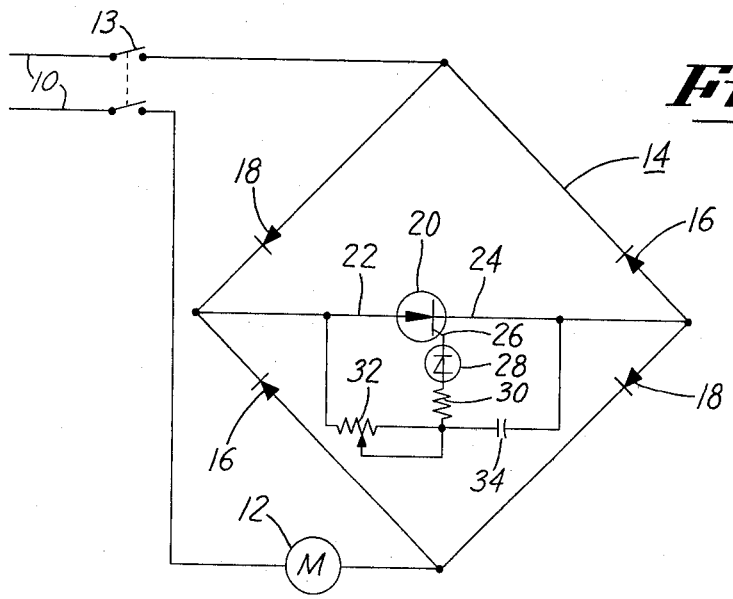

Referring now to FIGURE 1 of the drawing, reference numeral 10 designates the power supply lines through which power is supplied to an alternating current electric motor 12 through a main line switch 13 and a plural path bridge rectifier network, generally designated by the reference numeral 14. The network 14 includes a first pair of diodes 16 which are arranged to pass current to the motor during one portion of each cycle and reference numerals 18 designate a second pair of diodes arranged to pass current to the motor during another portion of each cycle.

A silicon controlled rectifier 20 having an input terminal 22 and an output terminal 24 and a gate or control terminal 26 is arranged in the bridge of the bridge network as shown whereby any current flowing to the motor is required to pass through the silicon controlled rectifier 20. Thus, it is apparent that current flowing through the silicon controlled rectifier flows in the same direction for all portions of each cycle of the applied voltage.

A four-layer diode 28 is connected in series with the current limiting resistance 30 and the gate or control terminal 26 of the silicon controlled rectifier 20. A variable resistance or potentiometer element 32 and a capacitor 34 are connected in series across the input and output terminals 22 and 24 of the silicon controlled rectifier 20. The capacitor 34 is arranged in the circuit as shown and charges up through the potentiometer 32 until the condenser voltage equals the break-over voltage of the four-layer diode. The capacitor then discharges through the gate circuit of the silicon controlled rectifier and the silicon controlled rectifier fires. In this manner the four layer diode does not fire until it reaches a break-over voltage which is delayed by the time constant of the potentiometer and capacitor network in proportion to the resistance of the potentiometer 32. The silicon controlled rectifier can be controlled over approximately 180° conduction angle by delaying the firing voltage of the four-layer diode.

Figure 2:
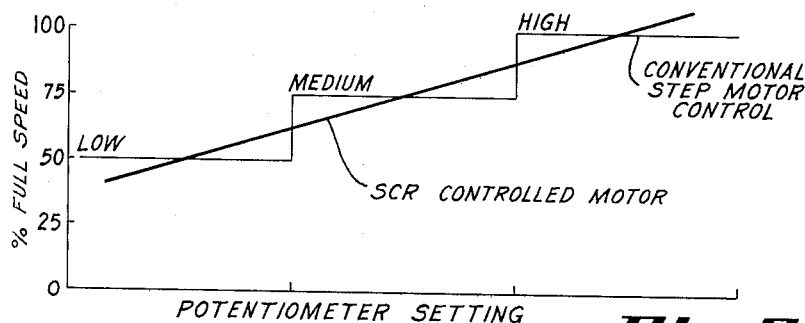
FIGURE 2 is a chart which illustrates the difference in motor speed between a conventional step controlled motor and a motor controlled by the system shown in FIGURE 1.

FIGURE 2 of the drawing illustrates the difference in motor speed between a conventional step controlled motor and a motor controlled by the system shown in FIGURE 1.

Figure 3:
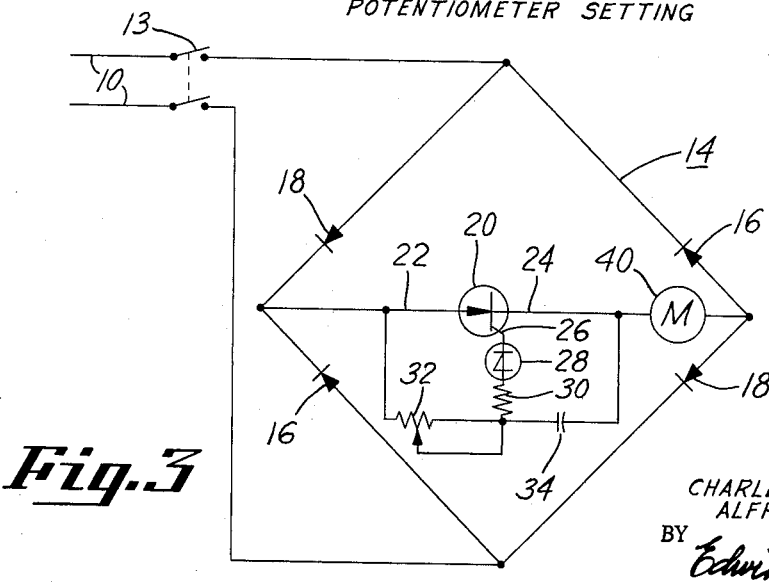

In FIGURE 3 there is shown a motor control circuit similar to that shown in FIGURE 1 except that a direct current motor 40 is located in the circuit as shown so that only direct current is supplied to the motor. This system makes it possible to operate a direct current motor from an alternating power source and to vary the speed of the motor by varying the resistance of the potentiometer element 32.

The same reference numerals have been used to designate like parts in FIGURES 1 and 3 of the drawing and except for the differences noted the systems are alike and therefore the system shown in FIGURE 3 will not be described in greater detail.

While the embodiment of the present invention, as herein disclosed, constitutes a preferred form, it is to be understood that other forms might be adopted.

What is claimed is as follows:

1. In a motor speed control circuit, a source of alternating current power, a motor, means connecting said motor to said power source including a silicon controlled rectifier having a gate, a first pair of diodes connected in series with said rectifier and arranged to conduct current through said rectifier in one direction during one portion of each cycle, a second pair of diodes connected in series with said rectifier and arranged to conduct current through said rectifier in said one direction during another portion of said cycle, said silicon controlled rectifier having an input terminal and an output terminal, a shunt circuit containing a capacitor and a resistance connecting the input terminal and the output terminal of said rectifier, and a four-layer diode connecting the gate of said rectifier with a point on said shunt circuit between said capacitor and said resistance whereby said resistance capacitor shunt circuit is supplied with rectified current to build up a charge upon said capacitor in accordance with the time constant of said shunt sufficient periodically to break down said four-layer diode and allow said capacitor to discharge periodically through said four-layer diode to said gate to periodically fire said silicon controlled rectifier.

2. In a motor speed control circuit, a source of alternating current power, a motor, means connecting said motor to said power source including a silicon controlled rectifier having a gate, a first pair of diodes connected in series with said rectifier and arranged to conduct current through said rectifier in one direction during one portion of each cycle, a second pair of diodes connected in series with said rectifier and arranged to conduct current through said rectifier in said one direction during another portion of said cycle, said first and second pairs of diodes being connected in a bridge network with the rectifier arranged in the bridge said silicon controlled rectifier having an input terminal and an output terminal, a shunt circuit containing a capacitor and a resistance connecting the input terminal and the output terminal of said rectifier within said bridge, a four-layer diode connecting the gate of said rectifier with a point on said shunt circuit between said capacitor and said resistance whereby said resistance capacitor shunt circuit is supplied with rectified current to build up a charge upon said capacitor in accordance with the time constant of said shunt sufficient periodically to break down said four-layer diode and allow said capacitor to discharge periodically through said four-layer diode to said gate to periodically fire said silicon controlled rectifier, and means for varying the time constant of said shunt circuit for varying the delay in the firing of the silicon controlled rectifier.

References Cited by the Examiner

UNITED STATES PATENTS

| 2,552,206 | 5/51 | Moyer | 318—246 |
| 2,935,674 | 5/60 | Hohne | 307—88.5 |
| 2,981,880 | 4/61 | Momberg et al. | 318—345 X |
| 3,103,618 | 9/63 | Slater. | |
| 3,123,757 | 3/64 | Gaudet | 318—327 |

OTHER REFERENCES

Controlled Rectifier Manual, 1st ed., General Electric, 1960, pages 94, 96.

Application and Circuit Design Notes, Bulletin D420-02-12-59, Solid State Products, Inc., page 14.

ORIS L. RADER, *Primary Examiner.*

MILTON O. HIRSHFIELD, *Examiner.*